(12) United States Patent
Meijer et al.

(10) Patent No.: US 8,659,897 B2
(45) Date of Patent: Feb. 25, 2014

(54) LIQUID-COOLED MEMORY SYSTEM HAVING ONE COOLING PIPE PER PAIR OF DIMMS

(75) Inventors: Gerhard I. Meijer, Zurich (CH); Derek I. Schmidt, Raleigh, NC (US); Mark E. Steinke, Durham, NC (US); James S. Womble, Hillsborough, NC (US)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 13/360,328

(22) Filed: Jan. 27, 2012

(65) Prior Publication Data
US 2013/0194745 A1 Aug. 1, 2013

(51) Int. Cl.
*H05K 7/20* (2006.01)
*G06F 1/20* (2006.01)

(52) U.S. Cl.
USPC .......... 361/699; 361/679.32; 361/679.53; 361/702; 361/704; 361/721

(58) Field of Classification Search
USPC .......... 361/679.31–679.32, 679.53–679.54, 361/699, 702, 704, 716, 721; 165/185
See application file for complete search history.

(56) References Cited

U.S. PATENT DOCUMENTS

| | | |
|---|---|---|
| 4,493,010 A | 1/1985 | Morrison et al. |
| 4,934,743 A | 6/1990 | Kapgan et al. |
| 5,057,968 A | 10/1991 | Morrison |
| 5,169,176 A | 12/1992 | Brossard |
| 5,338,070 A | 8/1994 | Horikawa et al. |
| 5,388,321 A | 2/1995 | Farrell |
| 5,566,988 A | 10/1996 | Johnston et al. |
| 5,662,362 A | 9/1997 | Kapgan et al. |
| 5,740,018 A | 4/1998 | Rumbut, Jr. |
| 6,421,240 B1 | 7/2002 | Patel |
| 6,496,375 B2 | 12/2002 | Patel et al. |
| 7,106,595 B2 * | 9/2006 | Foster et al. .............. 361/721 |
| 7,151,668 B1 | 12/2006 | Stathakis |
| 7,286,355 B2 * | 10/2007 | Cheon ....................... 361/699 |
| 7,400,506 B2 | 7/2008 | Hoss et al. |
| 7,450,384 B2 | 11/2008 | Tavassoli et al. |
| 7,675,748 B2 | 3/2010 | Matsushima et al. |
| 7,907,398 B2 * | 3/2011 | Hrehor et al. .......... 361/679.53 |
| 7,933,125 B2 * | 4/2011 | Wei et al. ................. 361/699 |
| 7,965,509 B2 | 6/2011 | Campbell et al. |
| 7,969,736 B1 * | 6/2011 | Iyengar et al. ............. 361/699 |

(Continued)

FOREIGN PATENT DOCUMENTS

| | | | | |
|---|---|---|---|---|
| CN | 200990051 Y | * | 12/2007 | ............... G06F 1/20 |
| DE | 10319984 A1 | | 12/2004 | |

(Continued)

*Primary Examiner* — Robert J Hoffberg
(74) *Attorney, Agent, or Firm* — Katherine S. Brown; Jeffrey L. Streets

(57) ABSTRACT

Each pair of memory modules in a memory system are cooled using a shared cooling pipe, such as a heat pipe or liquid flow pipe. An example embodiment includes one pair of memory module sockets on opposite sides of the respective cooling pipe. An inner heat spreader plate is thermally coupled to the cooling pipe and in thermal engagement with a first face of the memory module adjacent to the included cooling pipe. Heat is conducted from the second face of the memory module to the cooling pipe, such as from an outer plate in thermal engagement with an opposing second face of the memory modules and with the inner plate.

11 Claims, 7 Drawing Sheets

(56) References Cited

U.S. PATENT DOCUMENTS

| | | | |
|---|---|---|---|
| 8,027,162 B2 * | 9/2011 | Campbell et al. | 361/699 |
| 8,385,069 B2 * | 2/2013 | Iyengar et al. | 361/700 |
| 2006/0098409 A1 | 5/2006 | Cheon | |
| 2006/0250772 A1 * | 11/2006 | Salmonson et al. | 361/698 |
| 2008/0062652 A1 | 3/2008 | Lieberman et al. | |
| 2008/0074848 A1 | 3/2008 | Park et al. | |
| 2008/0084667 A1 | 4/2008 | Campbell et al. | |
| 2009/0002951 A1 * | 1/2009 | Legen et al. | 361/715 |
| 2010/0025010 A1 | 2/2010 | Cipolla et al. | |
| 2010/0091447 A1 * | 4/2010 | Jaggers et al. | 361/679.47 |
| 2011/0277967 A1 | 11/2011 | Fried et al. | |
| 2011/0286175 A1 | 11/2011 | Iyengar et al. | |
| 2013/0027870 A1 * | 1/2013 | Goldrian et al. | 361/679.32 |
| 2013/0120926 A1 * | 5/2013 | Barina et al. | 361/679.32 |
| 2013/0135812 A1 * | 5/2013 | Barina et al. | 361/679.32 |

FOREIGN PATENT DOCUMENTS

| | | | | |
|---|---|---|---|---|
| JP | 1270298 A | 10/1989 | | |
| JP | 2004079940 A | 3/2004 | | |
| WO | WO2011053313 A1 | 5/2011 | | |
| WO | WO2011110390 A1 | 9/2011 | | |
| WO | WO 2011110390 A1 * | 9/2011 | | H01L 23/473 |

\* cited by examiner

LIQUID-COOLED MEMORY SYSTEM HAVING ONE COOLING PIPE PER PAIR OF DIMMS

BACKGROUND

1. Field of the Invention

The present invention relates generally to cooling computer systems, and more particularly to liquid-cooling computer memory modules.

2. Background of the Related Art

Computer systems generate heat in relation to their power consumption. Cooling systems are used to maintain system components within prescribed temperature limits for operational reliability and safety. System components contribute in varying amounts to the total heat production of a computer system. While processors generally have the highest operating temperatures, system memory can consume a significant percentage of the total system power and generate a corresponding amount of heat. In a server, for instance, memory modules may be responsible for as much as 50% of the total heat load. Increasingly powerful component configurations are being developed for use in pre-defined dimensional constraints. For example, server systems often must conform to existing, standardized server chassis dimensions, while other computer systems are becoming more compact. The increased component and thermal densities present significant cooling demands and challenges.

Large computer systems, such as in data centers, typically have a rack-mounted, modular construction. Traditionally, servers and other equipment have been cooled by forced-convection cooling, using air moving devices, such as fans and blowers. These air moving devices are often designed to displace hot air away from the components by creating parallel air flow paths that circulate through the chassis and rack. Air moving systems may take the form of a computer room air conditioning (CRAC) system, a chassis fan system, fans in an individual node or group of nodes, or combinations of these air moving systems. However, compact chassis form factors and high component density leaves only limited space for airflow. As the density of heat generating components increases, therefore, air cooling solutions are becoming more complicated and costly.

In recent years, liquid cooling has been proposed as an alternative to conventional forced-air convection cooling. Liquid-cooled structures have been shown to be more effective at cooling on a per-energy-unit basis in some circumstances, such as in cooling large data centers. However, current liquid-cooled systems tend to have a higher initial cost and level of design complexity relative to air-cooled systems. Therefore, existing liquid-cooled system can be cost-prohibitive in some installations.

BRIEF SUMMARY

A disclosed embodiment of a liquid-cooled computer memory system includes first and second manifolds for circulating a chilled liquid. Each of a plurality of cooling pipes is thermally coupled at one end to the first manifold and at the other end to the second manifold. One pair of memory module sockets is included for each cooling pipe. Each pair of memory module sockets extends on opposite sides of a respective one of the cooling pipes. A heat spreader is removably positionable on a memory module connected to one of the sockets. The heat spreader includes an inner plate thermally coupled to the cooling pipe and in thermal engagement with a first face of the memory module adjacent to the included cooling pipe.

A disclosed embodiment of a cooling apparatus for a computer memory system includes a plurality of cooling pipes each thermally coupled at one end to a first liquid manifold and at the other end to a second liquid manifold. Each cooling pipe is positioned between a different pair of memory module sockets, such that the number of cooling pipes is half the number of memory module sockets. A heat spreader is removably positionable on a memory module connected to one of the sockets. The heat spreader is configured such that an inner plate of the heat spreader is automatically thermally coupled to the cooling pipe and is thermally engaged with a first face of the memory module adjacent to the included cooling pipe in response to positioning the heat spreader on the memory module.

DETAILED DESCRIPTION

Figure 1:
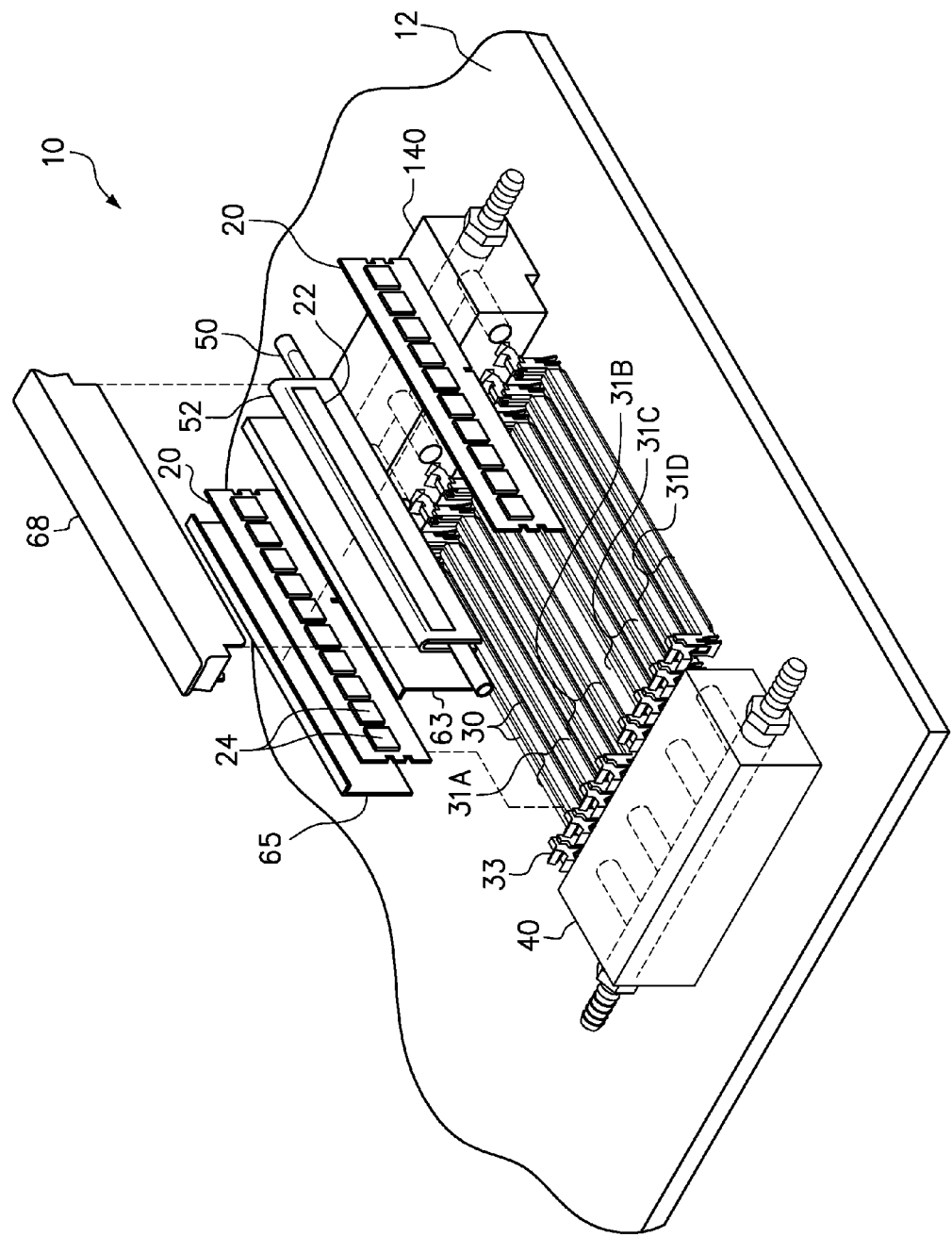
FIG. 1 is an exploded perspective view of a liquid-cooled computer memory system in which a plurality of DIMMs are cooled using only one cooling pipe for every adjacent pair of DIMMs.

A cooling system is disclosed that effectively cools memory modules in a memory system using only one cooling pipe for every two adjacent memory module sockets. The example embodiments discussed below use standard dual in-line memory modules (DIMMs) having a plurality of dual random access memory (DRAM) chips. The cooling system includes a liquid cooling loop for circulating chilled liquid (i.e. coolant), and allows for the DIMMs to be easily removed for service from the liquid cooling loop. The cooling pipes are typically liquid flow pipes for passing liquid coolant from a first manifold to a second manifold within the cooling loop. However, in an embodiment with lower DIMM power states, the liquid flow pipe can be substituted with a closed, hollow heat pipe containing a working fluid separate from the coolant circulating through the manifolds. The cooling system includes various heat transfer components for efficiently conducting heat from both DIMMs in a given pair to a single cooling pipe shared by the pair of DIMMs. This reduces the number of cooling pipes required to cool a given number of DIMMs. For example, eight DIMMs may be cooled using only four liquid flow pipes. Reducing the number of cooling pipes may reduce the BOM (bill of material) requirements, such as in reducing a parts count and complexity of cooling system components. In an embodiment using liquid flow pipes, this may also reduce the net volumetric flow rate requirements as compared with a conventional system using nearly one liquid flow pipe per DIMM. Reducing the BOM costs and coolant flow rate can significantly reduce the manufacturing and operating costs.

One disclosed embodiment of a memory system includes a plurality of liquid flow pipes fluidly coupled at the ends to first and second manifold blocks in a cooling loop. One liquid flow pipe is provided for each pair of DIMM sockets. For example, in a configuration having two channels with four DIMMs per channel, four liquid flow pipes are provided to cool four pairs of DIMMs (a total of eight DIMMs). Individual DIMM sockets of a pair extend along opposite sides of a respective liquid flow pipe. Each liquid flow pipe is centrally positioned between the respective pair of DIMM sockets. The DIMM sockets of each pair (and the DIMMs, when connected to the DIMM sockets) are typically parallel to one another and to the centrally positioned liquid flow pipe.

This system further includes a heat spreader removably positionable on each memory module. Various embodiments of the heat spreader are disclosed. In one embodiment, each heat spreader includes an inner plate, which thermally engages the face of the DIMM adjacent to the centrally-positioned liquid flow pipe. The inner plate is also thermally coupled to the liquid flow pipe, either by direct thermal engagement of the inner plate with the liquid flow pipe or using an intermediary, thermally-conductive collar positioned over the liquid flow pipe that thermally bridges the inner plate to the liquid flow pipe. The heat spreader may also include an outer plate in thermal engagement with a second face of that DIMM opposite the first face. The inner and outer plates are in thermal engagement with one another, by overlapping along an upper edge of the respective DIMM. One unique feature of the heat spreader is that an outer plate conducts heat generated from an outer face of a DIMM to the centrally-positioned liquid flow pipe, without requiring a separate liquid flow pipe to thermally engage the outer face. Another heat spreader may be similarly positioned on the second DIMM in a pair of DIMM sockets. Alternatively, one working DIMM and one dummy DIMM, i.e. filler DIMM, may be connected to each pair of DIMM sockets, such as in a single-channel, four-DIMM configuration. The relative terms "inner" and "outer" are used in reference to the centrally-positioned liquid flow pipe, such that the inner plates extend along the side of the adjacent DIMMs that face the liquid flow pipe and the outer plates extend along the side of the adjacent DIMMs that face away from the liquid flow pipe.

DIMMs are the most frequently serviced component in servers. A number of features are disclosed, which contribute to the serviceability of memory system components without necessarily affecting existing chassis or system board dimensions. For example, the placement of the liquid-cooled manifold blocks adjacent to the ends of the DIMMs, rather than above the DIMMs, allows the DIMMs to be easily removed and replaced without interference. The heat or liquid flow pipes are also routed low along the system board between the DIMM sockets, so as to avoid interference with accessing the DIMMs. For example, the heat or liquid flow pipes may be low enough to avoid projecting above a height of the DIMM sockets. The heat or liquid flow pipes and heat spreaders are also configured to fit within the space available between adjacent DIMMs having a typical DIMM spacing. Thus, conventional chassis and system board dimensions may be unaffected by the presence of the cooling system components.

FIG. 1 is an exploded perspective view of a liquid-cooled computer memory system 10, in which two adjacent DIMMs 20 are cooled using only one cooling pipe 50. For ease of illustration, just one pair of DIMMs 20 and one cooling pipe 50 are shown in the exploded view of FIG. 1, along with some selected heat spreader components for one of the DIMMs 20. The system 10 includes eight DIMM sockets 30 for accepting up to eight DIMMs 20. For discussion purposes, the eight DIMM sockets 30 are treated as four consecutive pairs 31A-31D, although the two DIMM sockets 30 in each pair 31A-31D of adjacent DIMM sockets 30 may be assigned to separate memory-system channels. Thus, in a two-channel memory configuration, each pair 31A-31D may receive two working DIMMs 20, each on a separate channel. In a one-channel memory configuration, each pair 31A-31D may receive one working DIMM 20 in one of the two DIMM sockets 30 and one non-working device, referred to as a "dummy" or "filler" DIMM, in the other of the two DIMM sockets 30.

The DIMM sockets 30 are mounted to a system board 12 in a parallel spatial orientation. The system board 12 is the primary circuit board of a computer, which includes communication pathways interconnecting system components, such as processors, memory, graphics cards, application cards, and so forth. The system board 12 may be the motherboard of a blade server or a desktop computer, for example. Each DIMM socket 30 includes a slot for receiving a card edge connector of a respective DIMM 20. The slots preferably orient the received DIMMs 20 perpendicularly to the system board 12. Each DIMM socket 30 also includes a latch 33 at each end operable to selectively release the received DIMM 20. A typical spacing is provided between the DIMM sockets 30. In the illustrated embodiment, the DIMM pitch (i.e., center-to-center spacing of the DIMMs) may be 10.16 mm, for example. As generally understood in the art apart from the specific teachings of this disclosure, a central processing unit (CPU, not shown) may generate input/output (I/O) instructions for alternately writing and reading from the DIMMs 20 to be installed in the DIMM sockets 30. The memory system 10 may also include a memory controller (not shown) in electronic communication with the DIMM sockets 30 for processing the I/O instructions.

The manifolds in this embodiment are in the form of a first manifold block 40 and a second manifold block 140 provided at opposite ends of the DIMM sockets 30. A total of four liquid flow pipes 50 (one is shown in FIG. 1) will be fluidly coupled at the ends to manifold blocks 40, 140 for circulating liquid through the liquid flow pipes 50 from the first manifold block 40 to the second manifold block. Each liquid flow pipe 50 is used to cool a respective pair of DIMMs 20.

A heat spreader (discussed further in FIG. 3) is provided for each DIMM 20. The heat spreader for just one DIMM 20 is shown in FIG. 1, though a similar heat spreader will be included for each of the other DIMMs. Each heat spreader includes inner and outer heat spreader plates, referred to as the inner plate 63 and outer plate 65, which are formed of thermally conductive materials such as aluminum or copper. Each DIMM 20 gets sandwiched between the two plates 63, 65, with the inner plate 63 in thermal engagement with one face of the DIMM 20 and the outer plate 65 in thermal engagement with the second face of the same DIMM 20 opposite the first face. The function of the plates 63, 65, individually, includes dissipating heat from DRAM chips 24 on respective faces of the DIMM 20. The inner plate 63 is in thermal engagement with a first face of the DIMM 20 adjacent to the liquid flow pipe 50 for dissipating heat from the DRAM chips 24 on that face. The inner plate 63 is also thermally coupled to the liquid flow pipe 50 for conducting heat to the liquid flow pipe 50. More specifically, the inner plate 63 is thermally coupled to the liquid flow pipe 50 in this embodiment using an optional intermediary thermally-conductive collar 52 positioned between the liquid flow pipe 50 and the two inner plates 63; though in another embodiment, the inner plate 63 may be in direct thermal engagement with the liquid flow pipe 50, with no intermediary thermally-conductive collar or other heat transfer member. The outer plate 65 is in thermal engagement with the opposite face of the DIMM 20 for dissipating heat from the DRAM chips 24 on that face. The outer plate 65 and inner plate 63 are in thermal engagement with each other along the top edge of the DIMM 20, so that heat is conducted from both faces of the DIMM 20 to the liquid flow pipe 50. Thus, one unique feature of the heat spreader is that the outer plate 65 conducts heat generated from the outer faces of the DIMM 20 to the inner plate 63 which conducts heat to the centrally-positioned liquid flow pipe. Accordingly, heat is dissipated from the outer face of the DIMM 20 without requiring a separate liquid flow pipe to thermally engage the outer face.

An assembly clip 68 is provided for each pair 31A, 31B of DIMM sockets 30 to bind the corresponding pair of DIMMs 20 and the attached heat spreaders and bias the DIMMs and heat spreaders toward the centrally positioned liquid flow pipe 50. For the system 10 having eight DIMM sockets 30, four assembly clips 68 are used. The assembly clip 68 is positionable about the heat spreaders that are attached to the pair of memory modules to bias the inner plates 63 of the heat spreaders into thermal engagement with the intermediary heat transfer collar 52 positioned over the centrally-positioned liquid flow pipe 50. A thermal interface material (TIM) 22 may be applied to the outer surfaces of the heat transfer collar 52 that are contacted by the inner plates 63. Alternatively, in a one-channel configuration that includes one working DIMM 20 and one filler DIMM per pair 31A-31D of DIMM sockets 30, the assembly clip 68 is similarly positionable about the one working DIMM with attached heat spreader and the adjacent filler DIMM. Although the filler DIMM does not generate any heat and does not require a heat spreader, the filler DIMM (discussed further in FIGS. 6 and 7) could still have outer dimensions similar to those of a working DIMM 20 with a heat spreader attached.

Heat pipes can be substituted for the liquid flow pipes in an embodiment with lower DIMM power states. The heat pipes are closed, hollow structures containing a working fluid separate from the chilled liquid circulating through the manifold blocks. The working fluid in the optional heat pipes evaporates on hot surfaces and re-condenses elsewhere in the heat pipes, to facilitate heat conduction through the heat pipes from the DIMMs to the manifold blocks 40, 140. Because the ends of the heat pipes are closed, however, the working fluid is confined to the sealed heat pipes and is separate from the chilled liquid circulating through each manifold block 40, 140.

Figure 2:
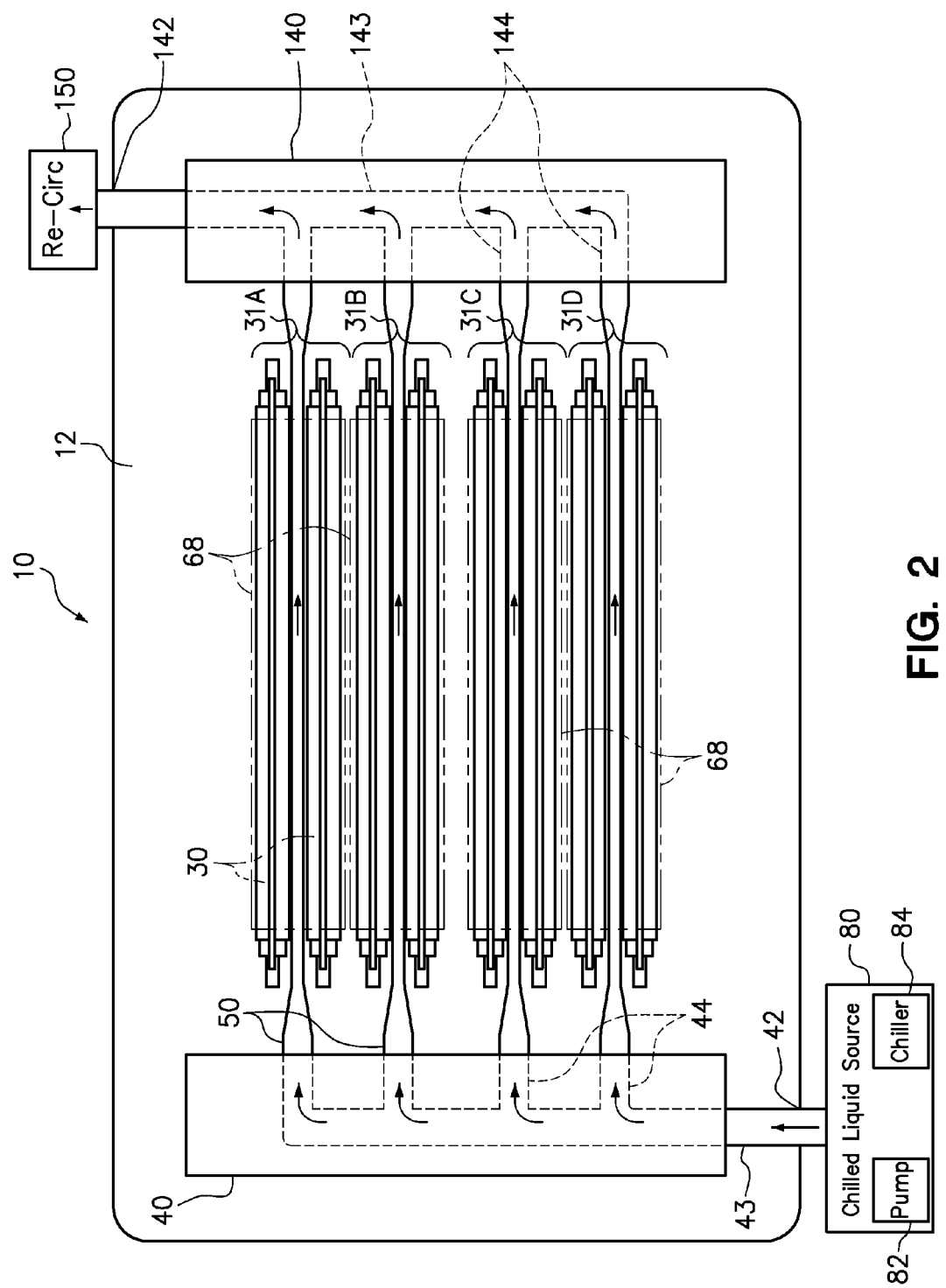
FIG. 2 is a plan view of the liquid-cooled computer memory system of FIG. 1, with the DIMMs omitted from view.

FIG. 2 is a plan view of the liquid-cooled computer memory system 10, with the DIMMs (20) removed from the eight DIMM sockets 30. The locations of the assembly clips 68 are shown in special line type, for reference. A chilled liquid flow assembly includes the first manifold block 40, the second manifold block 140, and the four evenly-spaced liquid flow pipes 50 extending along the system board 12 from the first block 40 to the second block 140. The liquid flow pipes 50 route chilled liquid, such as water, along the system board 12 in the space between the DIMM sockets 30. Because there is only one liquid flow pipe 50 per pair 31A-31D of DIMM sockets 30, the liquid flow pipes 50 are spaced every other DIMM socket 30. The first block 40 includes a liquid inlet port 42 connected to a primary flow passage 43. Four liquid flow passages 44 branch off of the primary flow passage 43 to fluidly couple the manifold block to the liquid flow pipes 50. The second block 140 includes a liquid outlet port 142 connected to a primary flow passage 143. A plurality of liquid flow passages 144 branch off of the primary flow passage 143 for fluidly coupling the liquid flow pipes 50 to the second manifold block 140.

A chilled liquid source 80 is schematically diagrammed in FIG. 1. The chilled liquid source 80 may be a conventional water chiller supplying chilled water to a variety of locations throughout a building, such as at a data center. The chilled liquid source 80 includes a chiller 84 for chilling the liquid and a pump 82 for moving the chilled liquid. The chilled liquid source 80 is fluidly coupled to the liquid inlet port 42 of the first manifold block 40, providing a flow of chilled liquid to the first manifold block 40 as needed. For example, the chilled liquid may flow as a continuous stream or a periodic stream to control the temperature of the memory modules. The chilled liquid supplied to the liquid inlet port 42 flows through the primary flow passage 43 and each of the branched flow passages 44 to the liquid flow pipes 50. The chilled liquid flows in parallel through the liquid flow pipes 50 to the second manifold block and exits through the liquid outlet port 142. Optionally, the liquid outlet port 142 of the second manifold block 140 may be coupled to a re-circulation system 150, as shown. The re-circulation system 150 may route the heated liquid back to the chilled liquid source 80. The re-circulation system 150 may also include a filtering subsystem to filter out any contaminants (e.g. corrosion byproducts), along with chemicals for treating the re-circulated water. Thus, heated liquid exiting the second manifold block 140 may be returned to the chiller 84 to be chilled, and then returned to the liquid inlet port 42 of the first manifold block 40. As an alternative to re-circulating the heated water exiting the second manifold block 140, the heated water may simply be drained from the system.

In the configuration of FIG. 1, the chilled liquid is supplied only to the first manifold block 40, and all of the chilled liquid flows through the liquid flow pipes 50 from the first manifold block 40 to the second manifold block 140. The cooling system is not limited to such unidirectional flow, however. In another embodiment, for example, chilled liquid may alternatively be provided to both manifold blocks 40, 140. Each manifold block 40, 140 may include both an inlet port and an outlet port, with an alternative routing of flow passages provided, so that chilled liquid flows through some of the liquid flow pipes 50 from the first manifold block 40 to the second manifold block 140 and chilled liquid flows through other liquid flow pipes from the second manifold block 140 to the first manifold block 40. For example, the chilled liquid may flow through the liquid flow pipes 50 in alternating directions, such that the direction of flow through one liquid flow pipe is opposite the direction of flow through the nearest adjacent liquid flow pipe.

Figure 3:
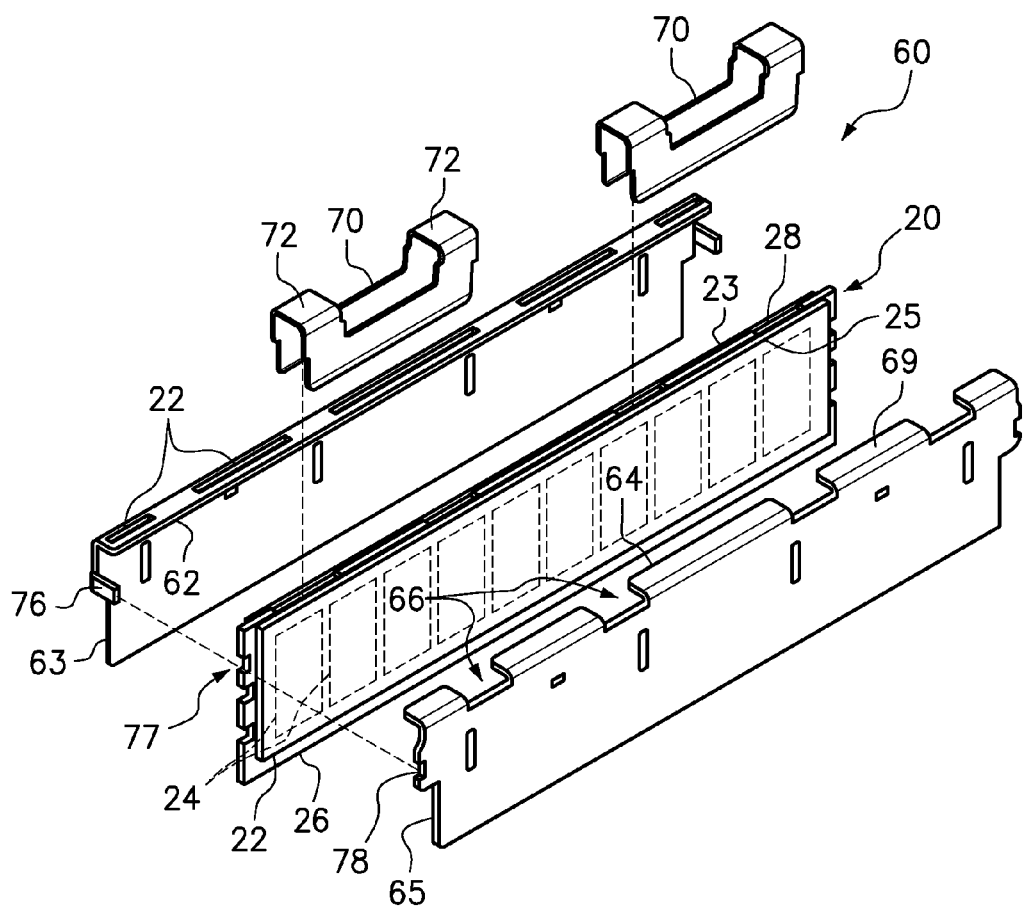
FIG. 3 is an exploded perspective view of a DIMM with a heat spreader for attaching to the DIMM.

FIG. 3 is an exploded perspective view of a DIMM 20 with a heat spreader 60 for attaching to the DIMM 20. During assembly of the memory system of FIG. 1, one heat spreader 60 of FIG. 3 may be attached to each DIMM 20 prior to insertion into a respective DIMM socket. A TIM 22 is optionally provided between the inner surfaces of the plates 63, 65 and the DRAM chips 24 on opposing faces 23, 25 of the DIMM 20. The TIM 22 gets compressed between the DRAM chips 24 and the flat surfaces of the plates 63, 65, providing reliable heat conduction therebetween. The TIM 22 is shown in this exploded view overlapping the DRAM chips 24, but in practice will typically be applied to the plates 63, 65 prior to assembly. A lower, card-edge connector 26 of the DIMM 20 that gets inserted into a slot on a DIMM socket includes a plurality of electrical contacts or "pins" (not shown). The parallel inner and outer plates 63, 65 thermally engage opposing faces 23, 25 of the DIMM 20, to dissipate heat from the DRAM chips 24 on the DIMM 20. The parallel plates 63, 65 are separate plates held in thermal engagement with the opposing faces 23, 25 of the DIMM 20 using spring clamps 70. The spring clamps are brought down into place and provide the necessary force to compress the TIMM 22 between the DRAM packages and the flat surface of both heat spreader plates 63, 65. In an alternative embodiment, the plates 63, 65 could be formed together as a unitary structure that slides over the upper edge of the DIMM 20. The heat spreaders 63, 65 have corresponding locking features 76, 78 along the sides of the inner plate that position the plates 63, 65 using slots 77 defined in the JEDEC (Joint Electronic Devices Engineering Council) specification for memory, to align the two plates 63, 65 relative to one another.

A flange 62 extends transversely inwardly from the inner heat spreader plate 63. A similar flange 64 extends transversely inwardly from the outer heat spreader plate 65. The flanges 62, 64 are preferably perpendicular to the heat spreader plates 63, 65, which in the illustrated orientation gives each heat spreader plate 63, 65 an inverted "L" shaped cross-section. When assembled about the DIMM 20, the flange 62 on the inner plate 63 rests along the top edge 28 of the DIMM 20, and the flange 64 on the outer heat spreader plate 65 is an upper flange that overlaps the flange 62 on the inner heat spreader plate 63. This overlap of the flanges 62, 64 provides thermal engagement between the two plates 63, 65 to effectuate heat conduction from the outer plate 65 to the inner plate 63, which contacts the liquid flow pipe (see FIG. 1). A TIM 22 may be applied between the two flanges 62, 64 to maximize thermal conduction. The thermal conduction from the outer plate 65 to the inner plate 63 provides more efficient heat transfer than conducting heat through the DIMM 20 from the first face 23 to the second face 25, since the substrate of the DIMM 20 has poor thermal conductivity compared to the metallic materials that may be used for the plates 63, 65.

The upper flange 64 on the outer heat spreader plate 65 has optional cutaways 66. The cutaways 66 in the upper flange 64 accommodate the spring clamps 70. The cutaways 66 receive the spring clamps 70 when the heat spreader 60 is assembled on the DIMM 20 so that an outer surface 72 of the spring clamp 70 is flush with an outer surface 69 of the segmented upper flange 64. This is done to keep the spring-clamps inside the volume of the heat spreaders, but is optional. The upper flange 64 could instead be a continuous flange. Also, the flange positions in another embodiment could be reversed, so that the flange 62 on the inner plate 63 is the upper flange that overlaps the flange 64 on the outer plate 65.

Figure 4:
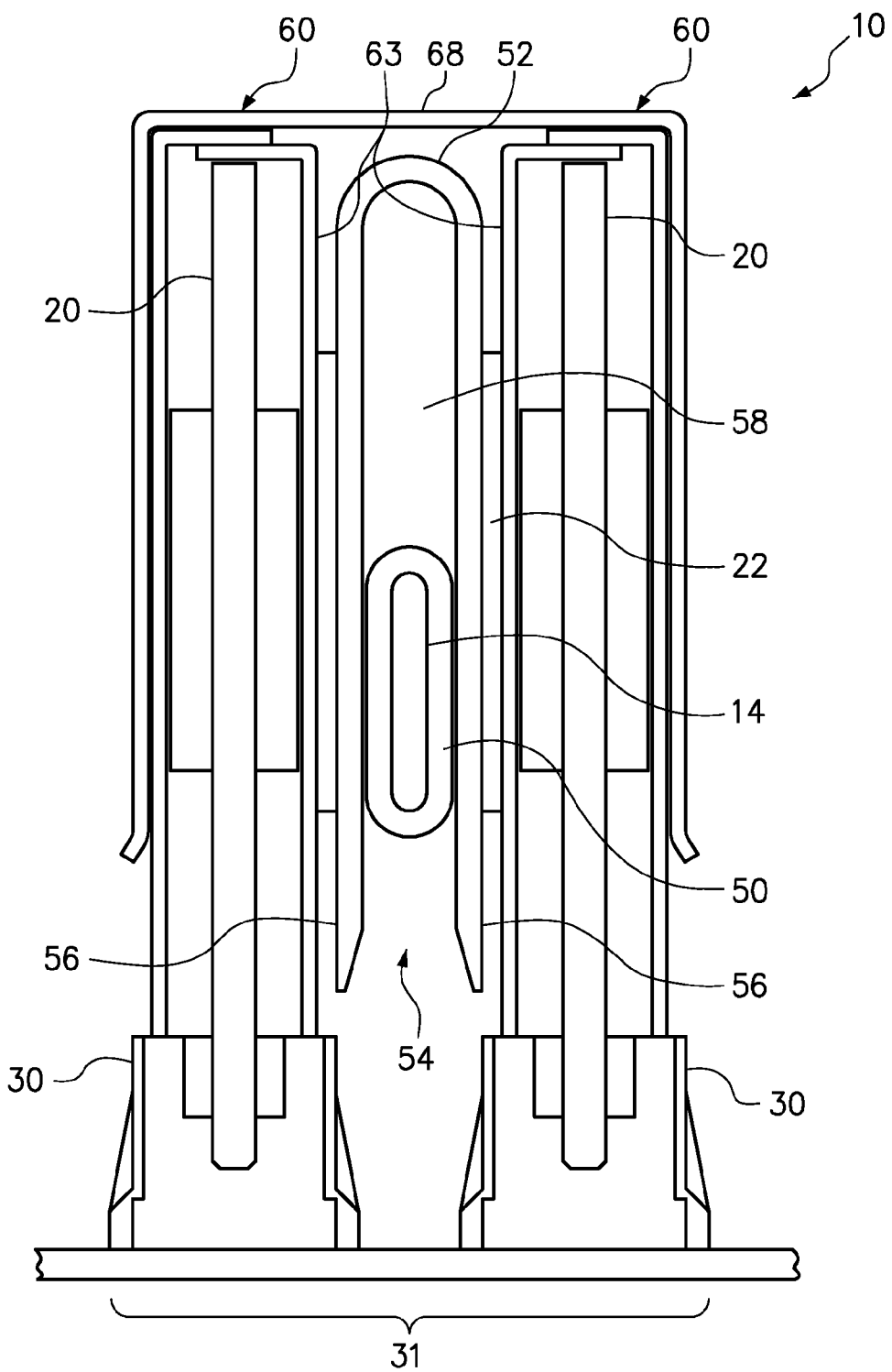
FIG. 4 is an elevation view of a selected pair of DIMM sockets with DIMMs inserted, along with attached heat spreaders and assembly clip, in an embodiment that includes an intermediary collar.

FIG. 4 is an elevation view of a selected pair 31 of DIMM sockets 30 and DIMMs 20, along with attached heat spreaders 60 and assembly clip 68, in an embodiment that includes the intermediary collar 52. The intermediary collar 52 is positioned on the centrally positioned liquid flow pipe 50. The collar 52 includes a groove 54 for receiving the liquid flow pipe 50 so that the collar 52 may be positioned over the liquid flow pipe 50. There may be a close or interference fit between the collar 52 and the flow pipe 50 for reliable thermal engagement between the flow pipe 50 and the collar 52. The shape of the collar 52, being open at its lower end, allows parallel legs 56 of the collar to flex slightly for receiving the flow pipe 50. The collar 52 is taller than (approximately three our four times the height of) the liquid flow pipe 50 to increase heat transfer from the inner plates 63 to the collar 52 and then to the liquid flow pipe 50. The TIM 22 is applied between the inner plates 63 and the collar 52. With the collar 52 being taller than the liquid flow pipe 50, a spacer 58 is provided to fill a space in the groove 54 not occupied by the liquid flow pipe 50. The spacer 58 is thermally conductive and substantially fills the space, to increase heat transfer from the collar 52 to the liquid flow pipe 50. Chilled liquid 14 flows through the liquid flow pipe 50. The chilled liquid is maintained at a temperature significantly cooler than the DIMMs 20 so that heat is continually conducted to the liquid 14 to cool the DIMMs 20.

The assembly clip 68 urges the inner plates 63 into firm thermal engagement with the collar 52. The tolerances of the illustrated components are selected such that little or no net lateral bending forces are applied to the DIMMs 20; effectively, the liquid flow pipe 50 and attached collar 52 bolster the DIMMs 20 against the inward force applied by the assembly clip 68.

The DIMM sockets 30 may be pre-installed on the system board 12, and the cooling pipes 50 may be permanently or semi-permanently coupled with the manifold blocks. In assembling components of the memory system of FIG. 1, a heat spreader 60 may be attached to each DIMM 20 to be installed (see FIG. 3). Then, each DIMM 20 with the attached heat spreader 60 may be individually inserted or removed in one of the DIMM sockets 30. The assembly clip 68 may then be positioned on each pair of DIMMs 20 inserted in the respective pair 31 of DIMM sockets 30. To subsequently remove a selected DIMM 20, the assembly clip 68 may first be removed. Then, the latches 33 (FIG. 1) may be operated to release the DIMM 20 and the DIMM 20 and attached heat spreader 60 may be pulled out of the socket 30. After removing the DIMM 20 and attached heat spreader 60, the heat spreader 60 may be disassembled from the DIMM 20 by pulling the plates 63, 65 apart.

Figure 5:
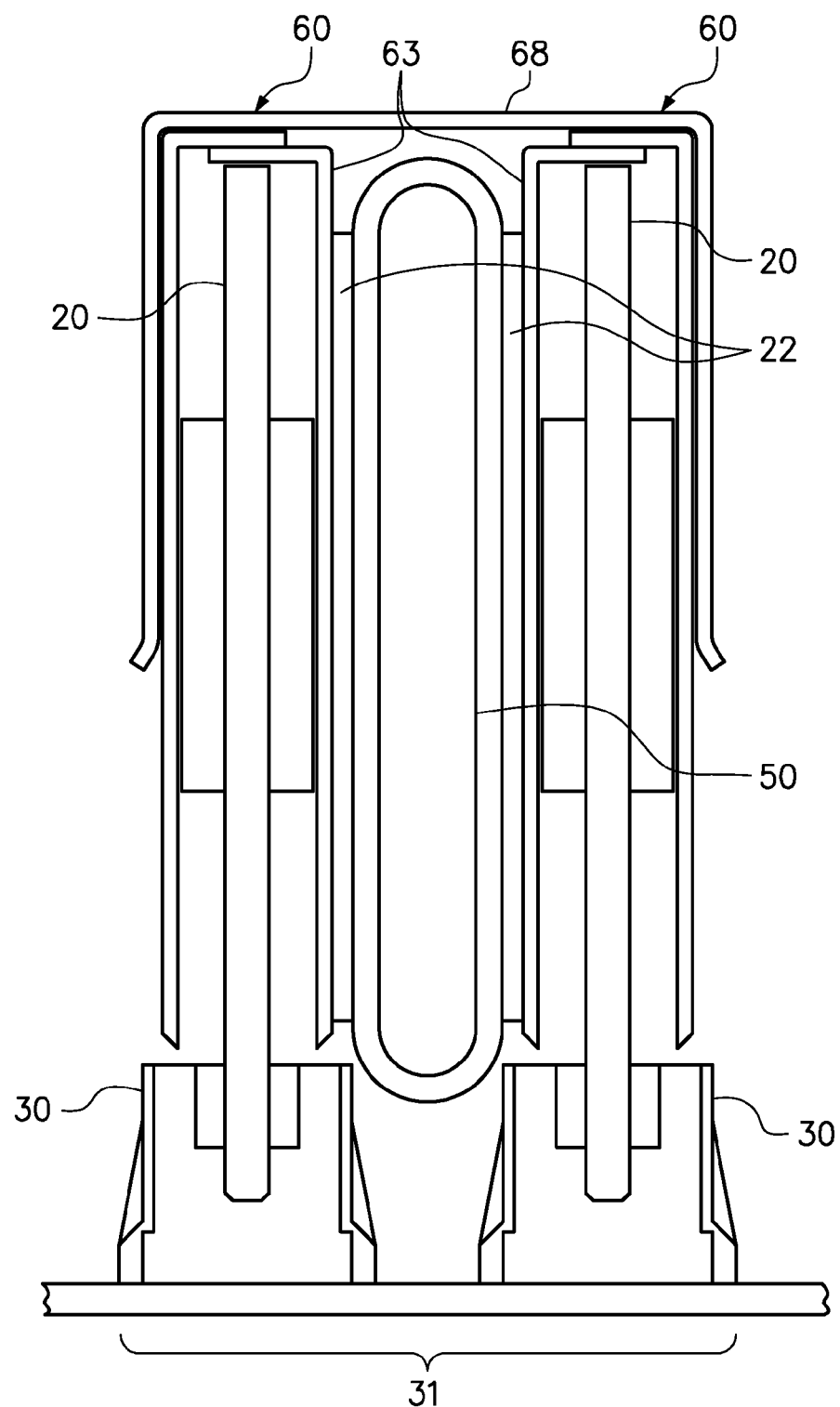
FIG. 5 is an elevation view of a selected pair of DIMM sockets and DIMMs, along with attached heat spreaders and assembly clip, in an embodiment that omits an intermediary collar.

FIG. 5 is an elevation view of a selected pair 31 of DIMM sockets 30 and DIMMs 20, along with attached heat spreaders 60 and assembly clip 68, in an embodiment that omits an intermediary collar. The liquid flow pipe 50 in this embodiment is taller, to increase the heat transfer surface area between the liquid flow pipe 50 and the inner plates 63 of the heat spreader 60. The TIM 22 is applied directly between the inner plates 63 of the heat spreaders 60 and the outer surfaces of the liquid flow pipe 50. The dimensions of the liquid flow pipe 50 and heat spreaders 60 are adjusted relative to the collar-including embodiment of FIG. 4, to provide a reliable thermal engagement between the liquid flow pipe 50 and the heat spreaders 60. Again, the dimensions are also selected so that the liquid flow pipe 50 bolsters the DIMMs 20 against the lateral forces imposed by the assembly clip 68.

Figure 6:
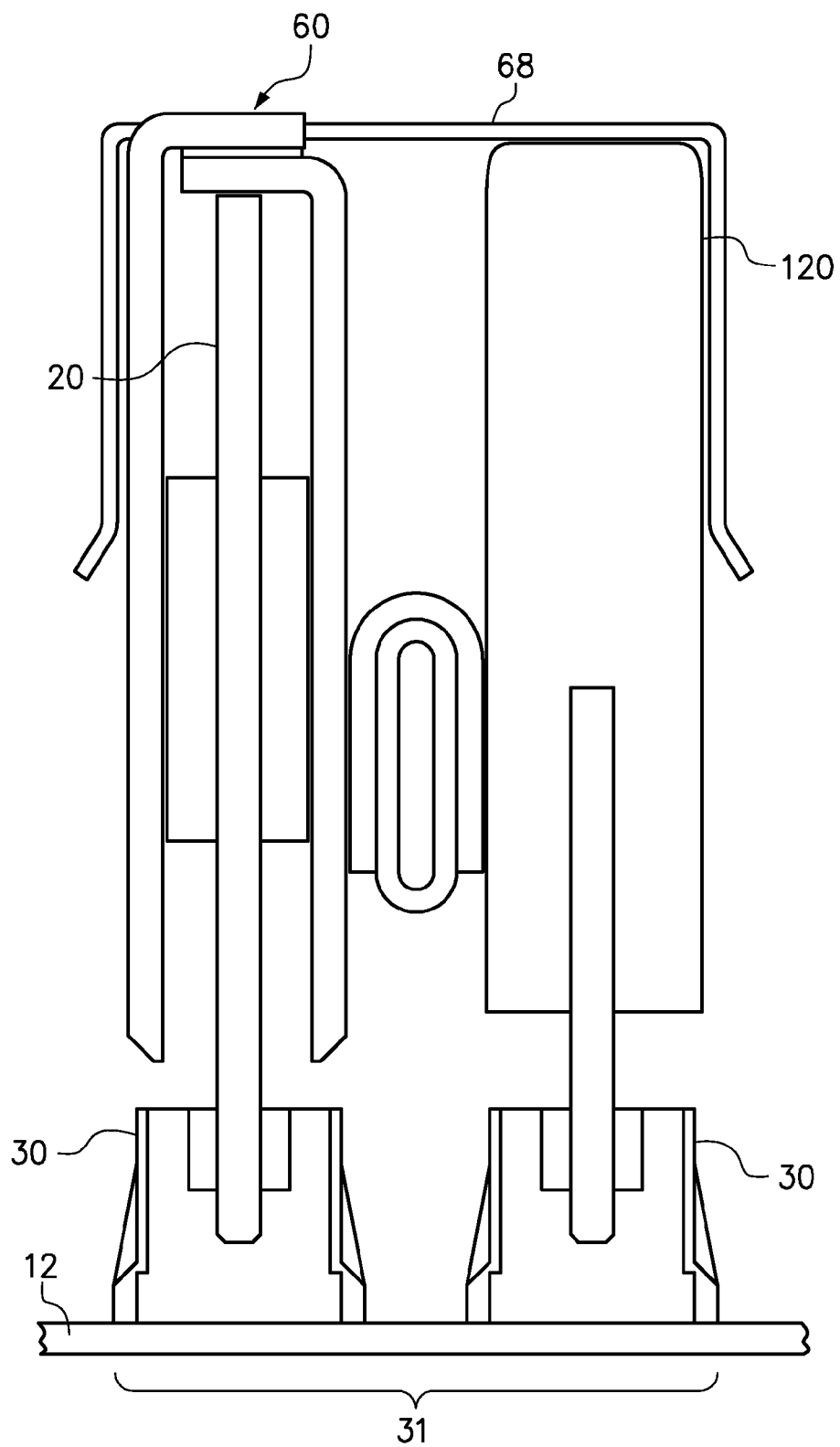
FIG. 6 is an elevation view of a selected pair of DIMM sockets with one working DIMM and one non-working, filler DIMM installed.

FIG. 6 is an elevation view of a selected pair 31 of DIMM sockets 30 with one working DIMM 20 and one non-working, filler DIMM 120. This is an example of how the pair 31 of DIMM sockets 30 might be utilized in a single-channel, four-DIMM memory configuration, wherein only one DIMM socket 30 in each pair would be occupied by an actual working DIMM 20. The working DIMM 20 has the DRAM chips, card edge pins, and so forth necessary to store and retrieve memory and to communicate with components of the system board 12 via the DIMM socket 30. The filler DIMM 120 may be inexpensive relative to the cost of the working DIMM 20, such as a molded plastic. The filler DIMM 120 may have no electrical terminals and no DRAM modules. The card edge may be a simple plastic edge, with no electrical contacts, that fits into the slot of the respective DIMM socket 30. The purpose of the DIMM filler 120 is to occupy the space that would ordinarily be occupied by a working DIMM and heat spreader. That way, the assembly clip 68 still fits over the one working DIMM 20 with attached heat spreader 60 and the one filler DIMM 120. The outer dimensions of the filler DIMM 120 in this embodiment are similar to those of the working DIMM 20 and attached heat spreader 60, as shown. Alternatively, the outer dimensions of the filler DIMM 120 could be made similar to those of the working DIMM 20, and a heat spreader attached to the filler DIMM 120 to fill the space normally occupied by a working DIMM and heat spreader.

Figure 7:
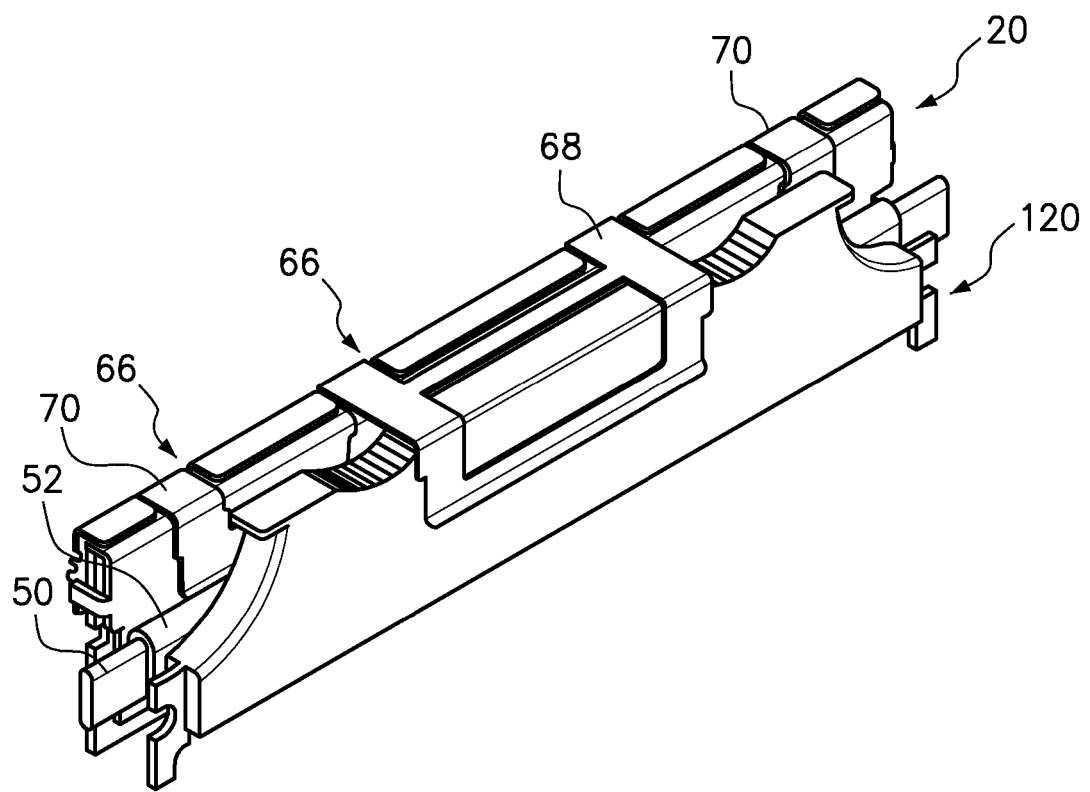
FIG. 7 is a perspective view of one working DIMM and one filler DIMM assembled about the liquid flow pipe and collar of FIG. 1.

FIG. 7 is a perspective view of one working DIMM 20 and one filler DIMM 120 assembled about the liquid flow pipe 50 and collar 52 of FIG. 1. The system board and DIMM sockets are omitted in this view. The assembly clip 68 holds together the DIMM 20 with attached heat spreader 60 and the filler DIMM, urging them against the collar 52 on the liquid flow pipe 50. The cutaways 66 receive the spring clamps 70 and the assembly clip 68 so that the upper surfaces of these components are all flush with one another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A liquid-cooled computer memory system, comprising:
first and second manifolds for circulating a chilled liquid;
a plurality of cooling pipes each thermally coupled at one end to the first manifold and at the other end to the second manifold;
one pair of memory module sockets included for each cooling pipe, with each pair of memory module sockets extending along opposite sides of the respective cooling pipe, each cooling pipe of the plurality of cooling pipes is included for only one pair of memory module sockets;
a memory module assembly comprising:
a memory module connected to one of the memory module sockets;
a heat spreader removably positionable on the memory module, the heat spreader comprising:
an inner plate thermally coupled to the cooling pipe and in thermal engagement with a first face of the memory module adjacent to the included cooling pipe;
an outer plate in thermal engagement with a second face of the memory module opposite the first face and in thermal engagement with the inner plate to conduct heat away from the second face of the memory module, through the inner plate of the heat spreader, and to the cooling pipe; and
a first flange on the inner plate and a second flange on the outer plate that overlap along the top edge of the memory module in thermal engagement with one another;
a spring clamp removably positionable about the inner and outer plates to bias the plates into thermal engagement with the opposing first and second faces of the memory module; and
one or more slots on an upper one of the first or second flanges, the one or more slots receiving the spring clamp;
an assembly clip positionable about a pair of memory module assemblies such that the assembly clip biases the inner plates of the heat spreaders on the pair of memory module assemblies into thermal coupling with the cooling pipe positioned between the pair of memory module assemblies, each of the pair of memory modules assemblies being the memory module assembly,
wherein some of the one or more slots of the heat spreader receive the spring clamp and the assembly clip such that a portion of the assembly clip is above a portion of the spring clamp, and the outer surface of the assembly clip is flush with an outer surface of an upper one of the first or second flanges.

2. The liquid-cooled memory system of claim 1, further comprising: a filler memory module substitutable for one of the memory modules, with the assembly clip positionable about the filler memory module and the other memory module to bias the inner plate of the heat spreader on the other memory module into thermal engagement with the cooling pipe positioned between the filler memory module and the other memory module.

3. The liquid-cooled memory system of claim 1, further comprising:
an intermediary heat conduction collar removably positionable over the cooling pipe for thermally bridging the inner plates of the heat spreaders with the cooling pipe.

4. The liquid-cooled memory system of claim 3, wherein the intermediary heat conduction collar is taller than the cooling pipe for increased contact area with the inner plates of the heat spreaders.

5. The liquid-cooled memory system of claim 4, further comprising:
a groove defined by the intermediary heat conduction collar for receiving the cooling pipe, wherein the cooling pipe does not fill the channel; and
a thermally conductive spacer positioned in the groove to fill a portion of the groove not filled by the cooling pipe.

6. The liquid-cooled memory system of claim 1, wherein the cooling pipes are liquid flow pipes fluidly coupling the first manifold to the second manifold for passing the chilled liquid from the first manifold to the second manifold through the liquid flow pipes.

7. The liquid-cooled memory system of claim 1, wherein the cooling pipes are heat pipes containing a working fluid separate from the chilled liquid.

8. The liquid-cooled memory system of claim 1, wherein each memory module socket comprises one or more latches operable to selectively release the received memory module, and wherein the heat spreaders and cooling pipes do not interfere with operation of the latch and with the removal of the memory modules from the memory module sockets.

9. The liquid-cooled memory system of claim 1, wherein the memory modules are dual in-line memory modules.

10. A cooling apparatus for a computer memory system having a plurality of memory module sockets, the cooling apparatus comprising:
 a plurality of cooling pipes each thermally coupled at one end to a first liquid manifold and at the other end to a second liquid manifold, each cooling pipe positioned between a different pair of memory module sockets, such that the number of cooling pipes is half the number of memory module sockets; and
 a memory module assembly comprising:
  a memory module connected to one of the memory module sockets;
  a heat spreader removably positionable on the memory module, the heat spreader comprising:
   an inner plate of the heat spreader is automatically thermally coupled to the cooling pipe and is thermally engaged with a first face of the memory module adjacent to the included cooling pipe in response to positioning the heat spreader on the memory module;
   an outer plate in thermal engagement with the inner plate such that the outer plate thermally engages a second face of the memory module opposite the first face;
   a first flange on the inner plate and a second flange on the outer plate that overlap along the top edge of the memory module in thermal engagement with one another;
   a spring clamp removably positionable about the inner and outer plates to bias the plates into thermal engagement with the opposing first and second faces of the memory module; and
   one or more slots on an upper one of the first or second flanges, the one or more slots receiving the spring clamp;
  an assembly clip positionable about a pair of memory module assemblies such that the assembly clip biases the inner plates of the heat spreaders on the pair of memory module assemblies into thermal coupling with the cooling pipe positioned between the pair of memory module assemblies, each of the pair of memory modules assemblies being the memory module assembly,
  wherein some of the one or more slots of the heat spreader receive the spring clamp and the assembly clip such that a portion of the assembly clip is above a portion of the spring clamp, and the outer surface of the assembly clip is flush with an outer surface of an upper one of the first or second flanges.

11. The cooling apparatus of claim 10, further comprising: a filler memory module substitutable for one of the memory modules, with the assembly clip positionable about the filler memory module and the other memory module, configured such that the inner plate of the heat spreader on the other memory module is biased into thermal engagement with the cooling pipe in response to positioning the assembly clip about the filler memory module and the other memory module.

* * * * *